United States Patent Office 3,349,066
Patented Oct. 24, 1967

3,349,066
POLYMERISATION PROCESS
Patrick Samuel Bryant, Welwyn Garden City, England, assignor to Imperial Chemical Industries Limited, London, England, a corporation of Great Britain
No Drawing. Filed July 22, 1963, Ser. No. 296,455
Claims priority, application Great Britain, July 31, 1962, 29,437/62
11 Claims. (Cl. 260—85.5)

ABSTRACT OF THE DISCLOSURE

Aqueous emulsion polymerization or copolymerization of vinylidene chloride using as the sole emulsifier, cationic compounds of the formula

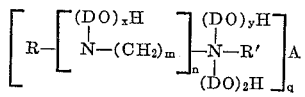

where R is a $C_{8-24}$ aliphatic hydrocarbon radical, R' is hydrogen or alkyl, D is alkylene, $m$ is an integer, $n$ is 0 or 1, $x+y+z$ is at least $n+2$ and A is an anion of valency $q$, for example the hydrochloride of ethoxylated tallow amine or the hydrochloride of the ethoxylated amino amine obtained by reacting propylene diamine with a fat such as tallow. The polymers produced have antistatic properties.

Disclosure

This invention relates to a process for the production of improved polymers and copolymers of vinylidene chloride.

The production of polymeric compositions having antistatic properties is well known and the antistatic properties are generally obtained by adding an antistatic agent to the polymer latex or the polymer particles in dry form before moulding or by coating objects shaped from the polymer compositions with a solution of the antistatic agent. All these methods have disadvantages. For example, the preferred antistatic agents are generally cationic compounds as they have been found to be more effective on the whole than anionic or non-ionic compounds. However, it is generally not possible to add a cationic compound to a latex of polyvinylidene chloride since the usual surface-active agents employed in the commercial polymerisation of vinylidene chloride are anionic compounds such as sodium salts of long chain alkyl sulphates or of alkyl benzene sulphonates and the addition of a cationic compound to a latex formed by such a polymerisation woud at least render it unstable and would probably coagulate it.

A number of the known antistatic agents are sticky or have low melting points, below the temperature at which a polymer composition would be subjected to a shaping operation such as injection moulding, and their incorporation in a polymer composition before the shaping operation causes difficulties in handling and results in a composition which has bad flow properties and generally poor handling characteristics. Also, it is difficult to disperse the agent satisfactorily through the composition and the result is a composition with variable antistatic properties.

Coating the moulded object with a solution of the antistatic agent is generally the least satisfactory as it may mar the finish of the object and will leave a surface which may be sticky to the touch in warm weather because of the low softening point of the antistatic agent. Also, the antistatic agent will rub off with handling and will therefore be only temporary in its effect.

It is an object of this invention to provide a process for manufacturing a polymer of vinylidene chloride having antistatic properties in which the antistatic agent is thoroughly dispersed throughout the polymer. It is a further object to provide a process for obtaining a polymer of vinylidene chloride in powder form having antistatic properties and good handling and flow properties. It is yet a further object of this invention to provide a process for the manufacture of polymers of vinylidene chloride which obviates the necessity of using two different compounds as the surface active agent in the polymerisation and the antistatic agent in the polymer.

We have now found surprisingly that certain alkoxylated quaternary ammonium salts act as satisfactory emulsifying agents in the emulsion polymerisation of vinylidene chloride and also act as antistatic agents in the polymeric product of the polymerisation, even after being subjected to elevated temperatures such as those used in shaping the polymer compositions.

According to the present invention we provide a process for the polymerisation of vinylidene chloride alone or with up to 50% by weight of the mixture of monomers of other copolymerisable monomers in aqueous emulsion in the presence of a water soluble free-radical polymerisation catalyst in which the polymerisation takes place in the presence of at least 0.05% by weight of monomer or monomers to be polymerised of one or more cationic quaternary ammonium compounds having the general formula:

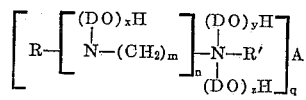

where R is an aliphatic hydrocarbon radical having from 8 to 24 carbon atoms, R' is hydrogen or an alkyl group, D is a straight chain alkylene group having at least 2 carbon atoms, $m$ is a positive integer, $n$ is 0 or 1, the sum of $x$, $y$ and $z$ is at least $n+2$, A is an anion and $q$ is a positive integer equal to the valency of A.

Also according to our invention, we provide the vinylidene chloride polymers containing an alkoxylated quaternary ammonium compound and having antistatic properties, whenever prepared by this process.

R may be saturated or unsaturated and is preferably a straight chain radical. Examples of radicals represented by R in the formula are n-octyl, n-decyl, n-decenyl, undecyl, undecenyl, lauryl, dodecenyl, tridecyl, myristyl, quindecyl, cetyl, heptadecyl, stearyl, oleyl and linoleyl radicals and their homologues. Compounds in which R is a chain of more than about 18 carbon atoms tend to be insufficiently soluble in water to give the control of particle size in the polymer latex that is desirable when manufacturing latices for eventual use in coating. This reduction in water-solubility may be obviated at least in part by increasing the alkoxy content of the compound but increasing the alkoxy content may have other adverse effects. Compounds in which R is a chain of less than about 12 carbon atoms, on the other hand, tend to have inadequate surface active properties. Therefore, we prefer R to contain from 12 to 18 carbon atoms. We further prefer R to contain 12, 14, 16 or 18 carbon atoms since quaternary ammonium compounds with these structures may be prepared singly or as mixtures from readily available sources such as natural fats and oils.

We prefer D to be an ethylene or propylene radical although a higher homologue may be used if desired. Where $n$ is O, the specified quaternary ammonium compound is a straight chain amine which has been alkoxylated on the nitrogen atom and then neutralized with an acid. In general, we have found that the use of those of the specified compounds which contain up to 10 alkoxy units per molecule give polymers which have very good antistatic properties but the incorporation of more than about 10 alkoxy units per molecule seems to give little or no further increase in effect and may even give a reduction in effect. For these and economic reasons, we prefer the sum of $y$ and $z$ to be from 2 to 10.

These particular quaternary ammonium compounds may be formed, for example, by reacting one mole of a suitable amine with the desired number of moles of an alkylene oxide, such as ethylene oxide, or a polymer of the alkylene oxide, and then neutralizing the tertiary amine so formed with an acid or an organic ester of an acid, e.g. dimethyl sulphate or hydrochloric acid. Thus if 6 moles of the alkylene oxide are reacted with one mole of the amine, the sum of $y+z$ in the quaternary ammonium compound will be 6. On the other hand, to achieve the same result, the amine may be reacted with 2 moles of the trimer of the alkylene oxide.

It will be appreciated that where a mixture of amines is used, such as would result from the amination of a tallow fat for example, the alkoxylation will not necessarily proceed stoichimetrically for each individual amine in the mixture but the products of the alkoxylation reaction will be a mixture of tertiary amines in which the average of the sums of $y$ and $z$ on each amine will be equal to the number of moles of the alkylene oxide reacted with each molar equivalent of the mixture. Where such mixtures are used, we prefer to use the products formed by reacting the amines with from 2 to 10 moles of the alkylene oxide (or the equivalent amount of a polymer thereof) per mole of the mixture.

Where $n$ is 1, the quaternary ammonium compound is derived from an amino-amine; we prefer $m$ to be 3 so that the compound is derived from an amino-propylamine. In this case, the sum of $x$, $y$ and $z$ must be equal to at least 3, and is again preferably not more than 10 for the reasons set out above. Here also, mixtures of our specified quaternary ammonium compounds may be derived from a natural oil or fat, in which case once more each individual aminoamine is not necessarily alkoxylated in the theoretically stoichiometric proportions in the alkoxylation reaction. Where such mixtures are used, we prefer to use the products formed by reacting the amino-amines with from 3 to 10 moles of the alkylene oxide (or the equivalent amount of a polymer thereof) per mole of the mixture.

Examples of quaternary ammonium compounds that may be used in the process of our invention are the acid or acid ester adducts of the polyethoxylated and polypropoxylated derivatives of laurylamine, myristylamine, oleylamine, stearylamine, linoleylamine, mixtures of amines such as coco-amine, tallow amine and soya-amine, laurylaminopropylamine, stearylaminopropylamine and mixtures of alkyl- and alkenylamino-amines derived from the amino-amination of a natural oil or fat with a diamine.

Examples of suitable acids and acid esters that may be used in the formation of our specified quaternary ammonium compounds are hydrochloric acid, methyl iodide, methyl bromide, sulphuric acid, dimethyl sulphate, nitric acid, the acids of phosphorus, boric acid, nitrous acid, methyl cyanate, acetic acid and ethyl acetate. It will be appreciated that this list of compounds is not exhaustive and that other acids or acid esters may be used if desired.

The amount of the quaternary ammonium compound used during the polymerisation is preferably not greater than 7% by weight of the monomer to be polymerised, because above this amount the improvement in antistatic properties is not significant.

Since higher concentrations of the quaternary ammonium compound in the polymer may have deleterious effects on the physical properties such as the slip or blocking properties of coatings produced from latices of the polymer or on the properties such as the impact strength or tensile properties of the product made by moulding the polymer, we further prefer to use not more than 5%.

Examples of monomers copolymerisable with vinylidene chloride are acrylonitrile, methacrylonitrile, methyl methacrylate, vinyl chloride, dimethyl fumarate, dimethyl maleate, methyl acrylate and ethyl acrylate which are used preferably in amounts of from 3 to 50% by weight of the vinylidene chloride. The amount of second component used will be dependent on the type of comonomer chosen and the properties required in the end product. This in turn will depend upon the use for which the end product is intended, e.g. for coating from solution or dispersion or for moulding. For coating applications it may be desirable to include small amounts (generally of the order of from 1 to 5% by weight of the mixture of monomers) of a copolymerisable monomer containing a carboxylic acid group. Examples are acrylic acid, maleic acid, itaconic acid and mono-esters of unsaturated dicarboxylic acids.

The process of this invention is particularly useful for the copolymerisation of vinylidene chloride with acrylonitrile to give latices suitable for coating substrates to give antistatic coatings or to give polymers in powder form which may be dissolved and used in solution coating substrates to give antistatic coatings. We prefer to use from 3 to 20% by weight of acrylonitrile based on the total weight of copolymerisable material.

The polymerisation of vinylidene chloride in aqueous emulsion may be carried out in any of the well known emulsion techniques. Polymerisation may be by batch, semi-continuous or continuous operation.

When the polymerisation is effected by an emulsion process in which the monomer is polymerised while dispersed in water and in the presence of a water-soluble catalyst, the quaternary ammonium compound acts as an emulsifying agent as well as donating antistatic properties to the final product. The addition of the emulsifying agent to the system may be effected in on step or in any number of steps or continuously during the course of at least part of the remainder of the polymerisation after the initial introducion. It is preferred to add the agent in a continuous manner since in this way some measure of control of the particle size on the latex may be achieved and this is particularly important when preparing film-forming latices for coating applications. If the final latex prepared in this way does not have the required stabiliy, this may be remedied by adding further quantities of the quaternary ammonium compound towards the end of the polymerisation just before venting the autoclave of unreacted monomer. This may be necessary for example when it is desired to separate the polymer from the latex by spray drying. The compound may also be added after venting in order to give the latex good "wetting" properties when it is to be used for dispersion coating applications.

Water-soluble catalysts which will not give radicals which donate negative charges to the polymer particles are preferably used in the process. Catalysts giving radicals which charge the polymer particles negatively would cause at least instability, and may even cause coagulation of the emulsion in the presence of a cationic surface active agent such as we use in our process. For example, catalysts that may be used for this process include peroxy compounds such as hydrogen peroxide, azosulphonates and water soluble azo-compounds having molecules containing the groups —> C—N═N—C <— in which both the carbon atoms are non-aromatic. The catalysts may if desired be used in conjunction with known activating materials.

Additional quantities of monomeric material may be added as the polymerisation proceeds if desired.

The polymer produced by these processes may be dried by spray-, drum-, or tray-drying techniques or any other well known techniques for drying, or the latex itself may be used for such applicaitons as coating for example. Common additives such as plasticisers, pigments, fillers and heat and light stabilisers may be used to modify the polymer and the product may be used in the production of coatings, films and other shaped articles by moulding, extruding, calendering and other processes of treatment and fabrication commonly applied to vinylidene chloride polymers.

Normally in the production of compositions with antistatic properties it has been usual to add the antistatic agent to the polymer after the polymerisation process and often this results in a sticky unmanageable powder which tends to clog any machinery through which it passes. However, as the antistatic agent which may be sticky is in this case present during the polymerisation process itself, it is well distributed over a larger surface area of the polymer than would otherwise be practicable and the resulting composition is a dry, dust-free powder which is not noticeably sticky, has good flow characteristics and improved handling characteristics and may be shaped by any suitable technique to give a product with good, evenly distributed and lasting antistatic properties.

As has been stated above, in the production of vinylidene chloride copolymer latices hitherto, anionic emulsifiers have been used in the main. The use of these emulsifiers has precluded the addition of cationic antistatic agents at the dispersion stage since such addition would at least have rendered unstable, and in all probability would have coagulated, the latex. Thus, only anionic or nonionic antistatic agents could be used and these have been generally unsatisfactory antistatic agents in the production of antistatic coatings made from the latices. Since our process uses a cationic surface-active agent which in itself gives good antistatic properties to any coating produced from the resultant latex, further additions of the same or other cationic antistatic agents may safely be made to the latex if required although in general we have found that the addition of other agents is unnecessary.

The polymers formed by the process of the invention are particularly suitable for use in coating films of other thermoplastic polymeric materials such as polypropylene and polyethylene terephthalate. The coatings increase the water vapour barrier properties of the films and endow them with antistatic properties. The coated films may be heat-sealed simply at reasonably low temperatures.

The polymers may be applied as coatings in any suitable manner, for example as solutions in any suitable solvent or as dispersions in water, in which case the unmodified latex produced by the polymerisation may be used if desired.

The polymers are also suitable for use in coating other films and foils such as metal foils and paper sheet.

Our invention is illustrated, but in no way limited, by the following examples in which all parts are expressed as parts by weight.

EXAMPLE 1

The following ingredients were charged into an autoclave.

| | Parts |
|---|---|
| Distilled water | 142 |
| Vinylidene chloride | 88 |
| Acrylonitrile | 12 |
| Hydrogen peroxide (100 vol.) | 0.59 |
| Ferrous sulphate (as a 1% aqueous solution) | 0.0003 |
| Surface active agent A, comprising a mixture of quaternary ammonium chlorides formed by ethoxylating a mixture of amines derived from tallow in the proportion of 2 moles of ethylene oxide to 1 mol of the amine mixture and neutralizing the product with hydrochloric acid | [1] 0.187 |

[1] In 1.87 parts of water.

The polymerisation was effected at 60° C. under nitrogen. During the polymerisation, a further 0.912 part of the mixture of quaternary ammonium salts was added (again as a 10% soluion in 9.12 parts of water) at the rate of 0.304 part per hour. After 3 hours, the pressure had fallen to 10 lbs./sq. inch gauge and the unreacted monomers were removed by evacuating to 20 inches of mercury.

To the latex obtained were added a further 3.5 parts of the mixture of quaternary ammonium salts and the latex was used for coating a polyethylene terephthalate film which before treatment had a high tendency to the accumulation of static electricity.

The coated film showed excellent antistatic properties and also showed improved resistance to the passage of water vapour through the film. The coated film could be heat-sealed with ease at 130° C.

EXAMPLES 2–5

The process of Example 1 was repeated a number of times using a variety of surface active agents in the polymerisation in place of A. They were as follows:

*Ex. 2.*—Surface active agent B: A mixture of quaternary ammonium chlorides obtained by ethoxylating a mixture of amines derived from tallow in the proportion of 15 moles of ethylene oxide to 1 mole of the amine mixture and neutralizing the product with hydrochloric acid.

*Ex. 3.*—Surface active agent C: As for A but using the mixture of amines known as coco-amine.

*Ex. 4.*—Surface active agent D: The product of reacting 1 mole of n-stearylamine with 2 moles of ethylene oxide and neutralizing the product with hydrochloric acid.

*Ex. 5.*—Surface active agent E: A mixture of quaternary ammonium chlorides obtained by reacting tallow with a molar amount of propylene diamine and reacting 1 mole of the resultant amino-amines with 3 moles of ethylene oxide. The product was neutralized with hydrochloric acid.

Each of the latices of Examples 2 to 5 was used for coating a polyethylene terephthalate film which before treatment had a high tendency to the accumulation of static electricity. Films coated with the latices derived by the processes of Examples 3 to 5 showed excellent antistatic properties and improved resistance to the passage of water vapour. The coated films could be heat-sealed with ease at temperatures of about 130° C.

The film coated with the latex derived by the process of Example 2 showed antistatic properties which were a considerable improvement over the uncoated film but the properties were not as good as those displayed in the film coated by the latices of Example 1 and Examples 3 to 5.

EXAMPLES 6–11

Quantitative measurements of the antistatic properties of thermoplastic films coated with vinylidene chloride polymers of our invention were made in the following manner:

To each of five latices prepared by the processes of Examples 1 to 5 were added 4 parts by weight of the quaternary ammonium salt used in the polymerisation and the latices were then used to coat five separate samples of polypropylene film. The coatings were dried at 100° C. for just under one minute.

An electric charge was then induced on the surface of each coated film from a high voltage source and the time ($T_{1/2}$) was then measured for the charge to decay to one-half its original value under conditions of a relative humidity of 50% and room temperature. The results are set out in the table below.

The measurement obtained from a polypropylene film coated under the same conditions with a copolymer of vinylidene chloride and acrylonitrile containing 5% by weight of sodium lauryl sulphate is included for comparison.

Short times indicate good antistatic properties and vice-versa.

| Example | Surface active agent used in polymerisation of vinylidene chloride | $T_{1/2}$ (seconds) |
|---|---|---|
| 6 | A | <0.1 |
| 7 | B | 18.5 |
| 8 | C | <0.1 |
| 9 | D | <0.1 |
| 10 | E | <0.1 |
| 11 | Sodium lauryl sulphate | >60 |

I claim:
1. A process for the manufacture of polymers of vinylidene chloride having antistatic properties in which vinylidene chloride is polymerized with from 0 to 50% by weight of the mixture of monomers of other copolymerizable monomers in aqueous emulsion in the presence of a water soluble free-radical polymerization catalyst and, as sole emulsifying agent, from 0.05% to 7% by weight of the polymerizable material of at least one cationic quaternary ammonium compound having the general formula

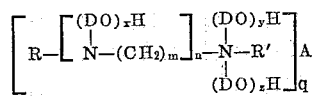

where R is an aliphatic hydrocarbon radical having from 8 to 24 carbon atoms, R' is selected from the group consisting of hydrogen and alkyl groups, D is a straight chain alkylene group containing at least two carbon atoms, m is a positive integer, n is selected from the group consisting of 0 and 1, x, y and z are whole numbers equal to or greater than zero the sum of x, y and z is at least n+2, A is an anion and q is a positive integer equal to the valency of A.

2. A process according to claim 1 in which D is selected from the group consisting of an ethylene and propylene radicals.

3. A process according to claim 1 in which R is an aliphatic hydrocarbon radical containing from 12 to 18 carbon atoms.

4. A process according to claim 1 in which n is 0 and the sum of y and z is from 2 to 10.

5. A process according to claim 4 in which the quaternary ammonium compound is the product of reacting 1 mole of stearyl amine with 2 moles of ethylene oxide and neutralizing the product with hydrochloric acid.

6. A process according to claim 1 in which the emulsifying agent is a mixture of quaternary ammonium compounds prepared by reacting an amine selected from the group consisting of coco-amine, tallow amine and soya-amine with an epoxide selected from the group consisting of ethylene oxide, propylene oxide and polymers thereof and neutralizing the product with a compound selected from the groups consisting of acids and acid esters.

7. A process according to claim 6 in which the emulsifying agent is a mixture of quaternary ammonium compounds prepared by reacting 1 mole of an amine selected from the group consisting of tallow amine and coco-amine with 2 moles of ethylene oxide and neutralizing the product with hydrochloric acid.

8. A process according to claim 1 in which n is 1 and the sum of x, y and z is from 3 to 10.

9. A process according to claim 1 in which the emulsifying agent is a mixture of quaternary ammonium compounds prepared by reacting the amino-amines derived from tallow fat and propylene diamine with an epoxide selected from the group consisting of ethylene oxide, propylene oxide and polymers thereof and neutralizing the product with a compound selected from the group consisting of acids and acid esters.

10. A process according to claim 1 in which the emulsifying agent is used in an amount of from 0.05 to 5% by weight of the polymerizable material.

11. A process according to claim 1 in which from 80 to 97 parts of vinylidene chloride are copolymerized with from 3 to 20 parts of acrylonitrile.

References Cited

UNITED STATES PATENTS

| 2,891,878 | 6/1959 | Chamberlain | 260 |
| 2,897,170 | 7/1959 | Gruber | 260—32.6 |
| 2,922,772 | 1/1960 | Coler et al. | 260 |
| 2,968,651 | 1/1961 | Friedrich et al. | 260—87.7 |

JOSEPH L. SCHOFER, *Primary Examiner.*

M. L. BERCH, J. A. DONAHUE, *Assistant Examiners.*